US010520792B2

(12) United States Patent
Liu et al.

(10) Patent No.: US 10,520,792 B2
(45) Date of Patent: Dec. 31, 2019

(54) RANGE FINDER

(71) Applicants: Sintai Optical (Shenzhen) Co., Ltd., ShenZhen, Guandong Province (CN); Asia Optical Co., Inc., Taichung (TW)

(72) Inventors: Hua-Tang Liu, Taichung (TW); Hui-Qing Chen, ShenZhen (CN); Lian Zhao, ShenZhen (CN); Chin-Hsiang Wang, Taichung (TW); Fang-Li Ma, ShenZhen (CN)

(73) Assignees: SINTAI OPTICAL (SHENZHEN) CO., LTD., Shenzhen, Guangdong Province (CN); ASIA OPTICAL CO., INC., Taichung (TW)

( * ) Notice: Subject to any disclaimer, the term of this patent is extended or adjusted under 35 U.S.C. 154(b) by 0 days.

(21) Appl. No.: 16/028,648

(22) Filed: Jul. 6, 2018

(65) Prior Publication Data

US 2018/0314136 A1    Nov. 1, 2018

Related U.S. Application Data

(63) Continuation-in-part of application No. 14/922,261, filed on Oct. 26, 2015, now abandoned.

(30) Foreign Application Priority Data

Nov. 3, 2014   (CN) .......................... 2014 1 0614411

(51) Int. Cl.
    *G03B 13/20*    (2006.01)
    *H04N 5/232*    (2006.01)
    (Continued)

(52) U.S. Cl.
    CPC ............ *G03B 13/20* (2013.01); *G01S 17/023* (2013.01); *G01S 17/08* (2013.01); *G02B 13/16* (2013.01);
    (Continued)

(58) Field of Classification Search
    CPC ............... G03B 13/20; H04N 5/22525; H04N 5/232121; G01S 17/023; G01S 17/08; G02B 13/16; G02B 25/001
    See application file for complete search history.

(56) References Cited

U.S. PATENT DOCUMENTS

| 3,732,793 | A | * | 5/1973 | Tague | .................. | G02B 27/281 |
| | | | | | | 359/437 |
| 4,549,802 | A | * | 10/1985 | Ohtaka | .................... | G02B 7/34 |
| | | | | | | 396/113 |

(Continued)

FOREIGN PATENT DOCUMENTS

| CN | 202547638 U | 11/2012 |
| CN | 203249619 U | 10/2013 |

(Continued)

*Primary Examiner* — Joseph Suh
(74) *Attorney, Agent, or Firm* — McClure, Qualey & Rodack, LLP

(57) ABSTRACT

A range finder includes a laser transmitter, a laser receiver, a large-aperture objective lens unit, an image sensing device, a display device and a microphone. The laser transmitter is configured to emit a laser beam to a measured object. The laser receiver is configured to receive a reflected laser beam reflected by the measured object. The objective lens unit is configured to allow visible light reflected by the measured object to pass therethrough, includes an objective lens and a focusing lens and has a length defined by the objective lens and the focusing lens. The image sensing device is configured to receive the visible light passing through the objective lens and generate an image signal. The length is constant when the objective lens unit is moved with respect to the image sensing device for focusing operation.

18 Claims, 6 Drawing Sheets

(51) Int. Cl.
*G02B 13/16* (2006.01)
*G01S 17/08* (2006.01)
*G01S 17/02* (2006.01)
*H04N 5/225* (2006.01)
*G02B 25/00* (2006.01)

(52) U.S. Cl.
CPC ... *H04N 5/22525* (2018.08); *H04N 5/232121* (2018.08); *G02B 25/001* (2013.01)

(56) References Cited

U.S. PATENT DOCUMENTS

| | | | | |
|---|---|---|---|---|
| 5,724,127 | A * | 3/1998 | Csipkes | G01M 11/31 356/73.1 |
| 6,028,714 | A * | 2/2000 | Koyama | G02B 15/163 359/683 |
| 6,614,537 | B1 * | 9/2003 | Yahashi | G01B 11/24 356/3.04 |
| 6,618,132 | B1 * | 9/2003 | Vann | G01S 17/42 235/384 |
| 2005/0096589 | A1 * | 5/2005 | Shachar | A61B 1/00158 604/95.01 |
| 2006/0164732 | A1 * | 7/2006 | Lee | G02B 3/14 359/676 |
| 2007/0036557 | A1 * | 2/2007 | Jackson | G01J 9/04 398/204 |
| 2009/0161091 | A1 * | 6/2009 | Yamamoto | G01C 3/08 356/4.01 |
| 2010/0152944 | A1 * | 6/2010 | Kouno | G05D 1/024 701/26 |
| 2011/0115963 | A1 * | 5/2011 | Sueyoshi | G02B 13/04 348/340 |
| 2011/0310226 | A1 * | 12/2011 | McEldowney | G01B 11/2513 348/46 |
| 2012/0013528 | A1 * | 1/2012 | Kim | G01S 17/023 345/156 |
| 2012/0062723 | A1 * | 3/2012 | Ghosh | G02B 21/16 348/79 |
| 2012/0157837 | A1 * | 6/2012 | Nagata | G01N 29/0672 600/437 |
| 2012/0261516 | A1 * | 10/2012 | Gilliland | G01S 17/107 244/183 |
| 2013/0194475 | A1 * | 8/2013 | Okamoto | H04N 5/23212 348/333.01 |
| 2014/0232651 | A1 * | 8/2014 | Kress | G02B 27/0172 345/158 |
| 2015/0094851 | A1 * | 4/2015 | Kawabe | B25J 11/0005 700/246 |
| 2015/0094953 | A1 * | 4/2015 | Montgomery | G06K 9/00671 701/514 |
| 2015/0130797 | A1 | 5/2015 | Chen et al. | |
| 2016/0004298 | A1 * | 1/2016 | Mazed | G06F 3/011 345/633 |
| 2016/0131876 | A1 * | 5/2016 | Schuster | G02B 5/1814 359/356 |
| 2016/0277843 | A1 * | 9/2016 | Babayoff | H04R 17/005 |
| 2017/0054969 | A1 * | 2/2017 | Lu | G02B 27/22 |

FOREIGN PATENT DOCUMENTS

| | | |
|---|---|---|
| JP | H7209403 A | 8/1995 |
| TW | 201428322 A | 7/2014 |

* cited by examiner

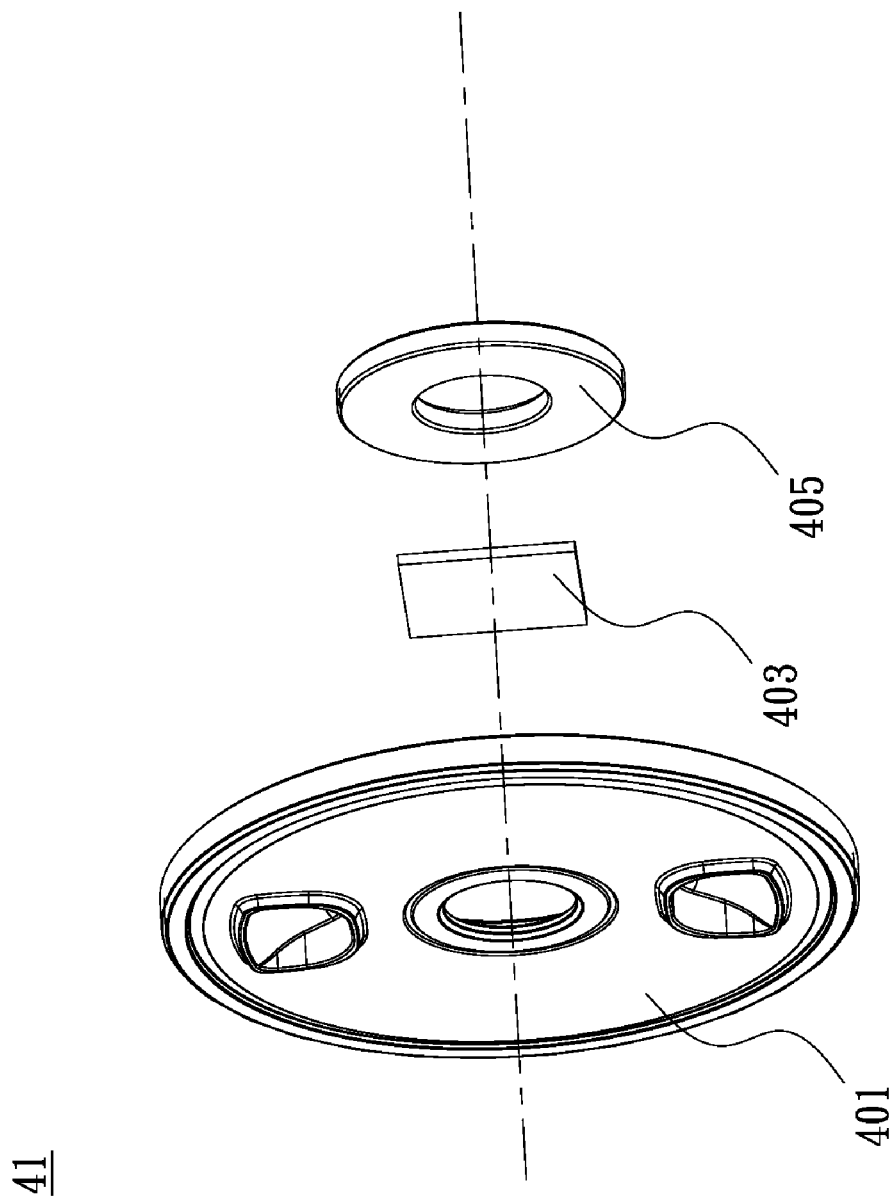

RANGE FINDER

CROSS REFERENCE TO RELATED APPLICATIONS

This application is a continuation-in-part application of U.S. patent application Ser. No. 14/922,261, "Range Finder", filed on Oct. 26, 2015, which claims priority to China Patent Application No. 201410614411.X, filed Nov. 3, 2014, all of which are incorporated herein by reference in its entirety.

BACKGROUND OF THE INVENTION

Field of the Invention

The invention relates to a range finder, and more particularly to a range finder with night vision function capable of operating at night or in an environment of insufficient light.

Description of the Related Art

Referring to FIG. 1, a range finder 10 capable of measuring a distance at night is shown. The range finder 10 is provided with a displaying system which includes a display device 17 and an eyepiece 18. The range finder 10 is further provided with an emitting-and-receiving system which includes a laser transmitter 12, a second collimating lens 21, an objective lens 13, a prism 14 and a laser receiver 19. The laser transmitter 12 emits a laser beam 12T to a measured object (not shown). The laser beam 12T is reflected by the measured object to become a reflected laser beam 12R. The reflected laser beam 12R is reflected toward the range finder 10 and received by the laser receiver 19. The range finder 10 is further provided with an image sensing system which includes the objective lens 13, the prism 14, a focusing lens 15 and an image sensing device 16 to capture an image of the measured object when the environment is well-lit. The range finder 10 is further provided with a night vision system which includes an infrared ray transmitter 11, a first collimating lens 20, the objective lens 13, the prism 14, the focusing lens 15 and the image sensing device 16 to capture an image of the measured object at night or in an environment of insufficient light. In operation, the infrared ray transmitter 11 emits infrared ray 11T to the measured object, and the infrared ray 11T is reflected by the measured object to become reflected infrared ray 11R. The reflected infrared ray 11R is reflected toward the range finder 10 and received by the image sensing device 16. The image sensing device 16 converts the received infrared ray into image signals. The image signals are transmitted to and displayed by the display device 17.

The prism 14 and the infrared ray transmitter 11 provide the night vision function for the range finder 10. However, the prism 14 and the infrared ray transmitter 11 increase the manufacturing cost. Further, the reflected visible light V10 and the reflected infrared ray 11R decay after passing through the prism 14, which reduces intensity of the visible light and infrared ray captured by the image sensing device 16 and thus affects the operation of the range finder.

BRIEF SUMMARY OF THE INVENTION

An object of the invention is to provide a range finder utilizing an objective lens with a large aperture and an image sensing device with high sensitivity to collect and receive a great amount of light, whereby the range finder of the invention is provided with night vision function even without the prism and the infrared ray transmitter used in the conventional range finder.

The range finder in accordance with an exemplary embodiment of the invention includes a laser transmitter, a laser receiver, a large-aperture objective lens unit, an image sensing device, a display device and a microphone. The laser transmitter is configured to emit a laser beam to a measured object. The laser receiver is configured to receive a reflected laser beam reflected by the measured object. The objective lens unit is configured to allow visible light reflected by the measured object to pass therethrough, includes a first objective lens having a first surface facing an object side and a first focusing lens having a second surface facing an image side and has a first length. The image sensing device is configured to receive the visible light passing through the objective lens and generate an image signal. The display device is configured to receive the image signal and display an image of the measured object. The microphone is configured to record sound. The first length is constant and defined as a distance between a center of the first surface and a center of the second surface. The objective lens unit is configured to move with respect to the image sensing device for focusing operation.

In another exemplary embodiment, the range finder further includes a collimating lens disposed between the laser transmitter and the measured object.

In yet another exemplary embodiment, the range finder further includes a collective lens disposed between the laser receiver and the measured object.

In another exemplary embodiment, the first focusing lens is disposed between the objective lens and the image sensing device.

In yet another exemplary embodiment, the range finder further includes an eyepiece disposed near the display device for observing the display device.

In another exemplary embodiment, the laser transmitter includes a semiconductor laser.

In yet another exemplary embodiment, the laser receiver includes an avalanche photodiode or a photodiode.

In another exemplary embodiment, the display device includes a liquid crystal display, an organic liquid crystal display or an active-matrix organic light emitting diode display.

In yet another exemplary embodiment, the image sensing device includes a charge coupled device or a complementary metal-oxide-semiconductor image sensing element.

In another exemplary embodiment, the range finder further includes a filter disposed between the collective lens and the laser receiver to allow only the reflected laser beam to pass.

In yet another exemplary embodiment, the reflected laser beam does not pass through the objective lens unit.

In another exemplary embodiment, the first length is 78.865 mm.

In yet another exemplary embodiment, the objective lens unit has an f-number ranging from 1.47 to 1.63.

In another exemplary embodiment, the range finder further includes an iris aperture, an electrochromic sheet or a photochromic sheet configured to constrain the visible light from entering the range finder.

In yet another exemplary embodiment, the objective lens unit has a moving distance, a second ratio of the moving distance to a distance between the objective lens unit and the image sensing device is about 0.04.

In another exemplary embodiment, the second ratio of the moving distance to the distance between the objective lens unit and the image sensing device ranges from 0.038 to 0.045.

In yet another exemplary embodiment, the range finder further includes an adjusting ring configured to move the objective lens unit with respect to the image sensing device for adjusting the distance.

In another exemplary embodiment, the image of the measured object is captured by the range finder at an object distance, and the object distance ranges from 4.5 m to ∞ when the distance between the objective lens unit and the image sensing device is adjusted.

In yet another exemplary embodiment, the range finder further includes a detachable frontal cover configured to constrain the visible light from entering the range finder for decreasing the amount of the visible light passing through the objective lens unit.

In another exemplary embodiment, the detachable frontal cover includes a main cover, an optical filter and a retaining ring, and the optical filter is disposed on the main cover by means of the retaining ring.

In yet another exemplary embodiment, an aperture of the objective lens unit has a first diameter, an aperture of the detachable frontal cover has a second diameter and a ratio of the second diameter to the first diameter ranges from 0.22 to 0.26.

In another exemplary embodiment, the objective lens unit further includes a second objective lens having a third surface facing the image side and a second focusing lens having a fourth surface facing the object side and has a second length, the first objective lens, the second objective lens, the second focusing lens and the first focusing lens are sequentially arranged from the object side to the image side and the second length is constant and defined as a distance between a center of the third surface and a center of the fourth surface.

In yet another exemplary embodiment, the second length is 40.32 mm.

In another exemplary embodiment, a ratio of the second length to the first length ranges from 0.48 to 0.54.

In yet another exemplary embodiment, a ratio of an aperture of the detachable frontal cover to an aperture of the objective lens unit ranges from 0.05 to 0.06.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 5 is an exploded view of the detachable frontal cover of FIG. 3B.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
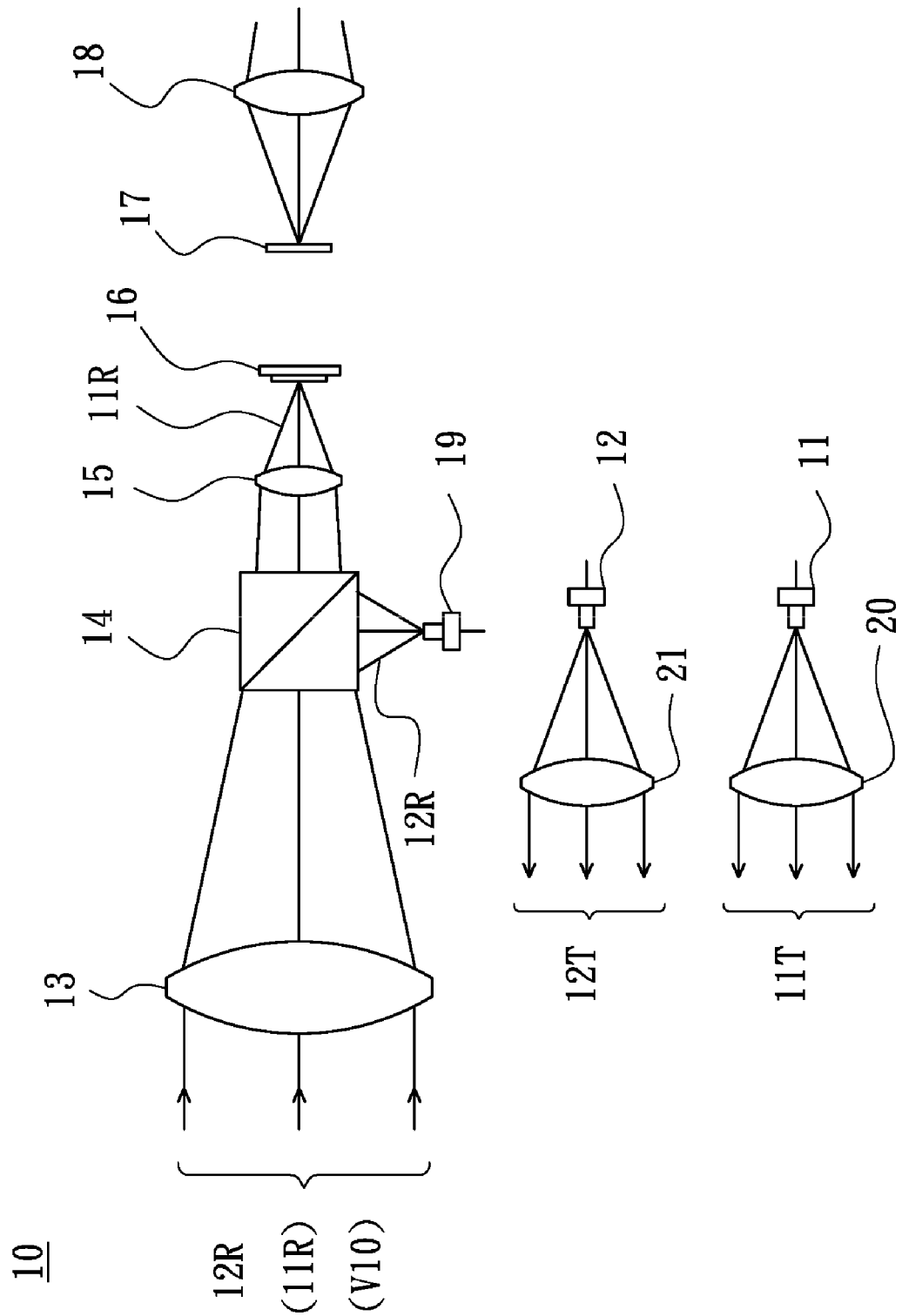
FIG. 1 depicts a conventional range finder with night vision function.
Figure 2:
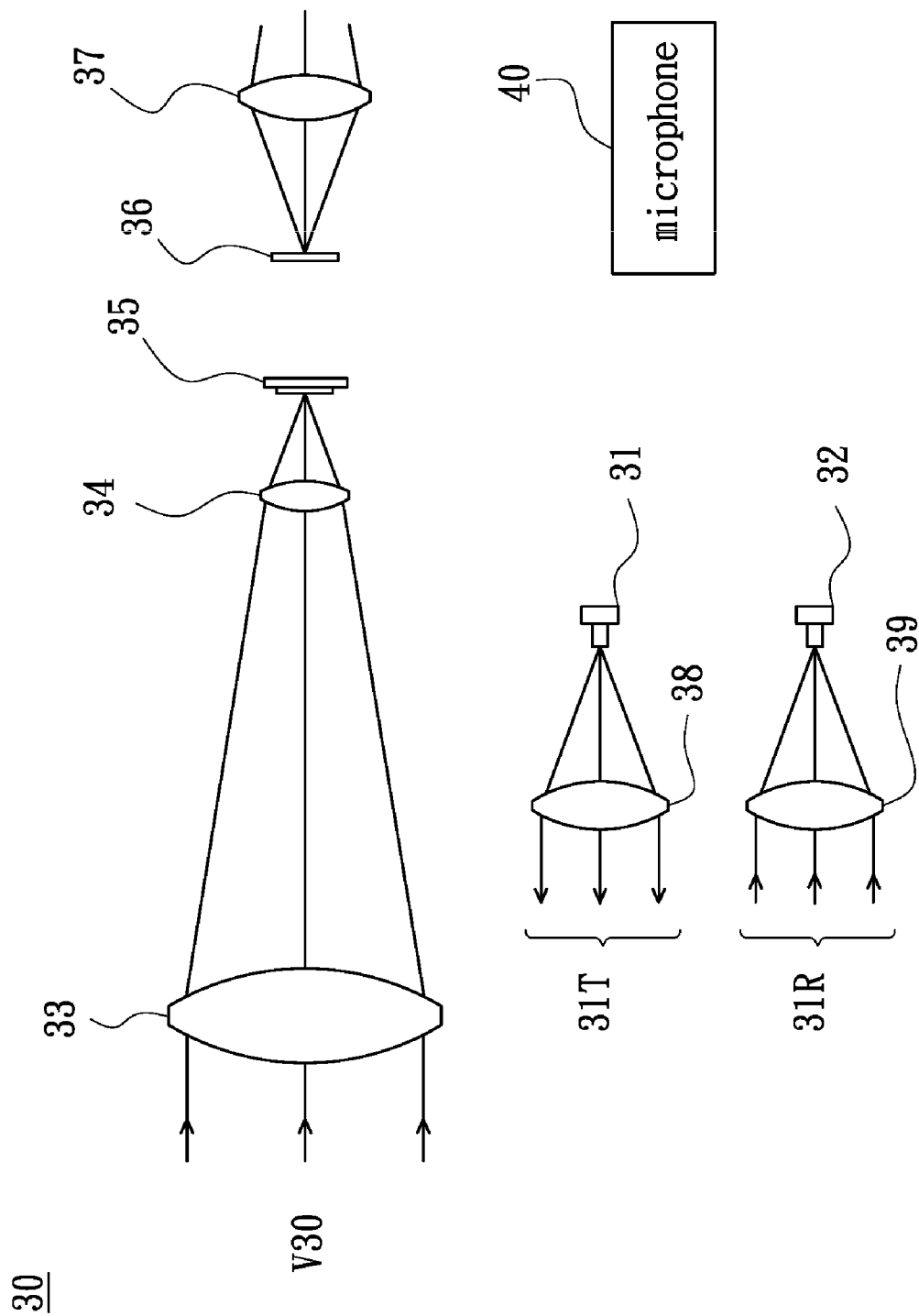
FIG. 2 depicts a range finder in accordance with a first embodiment of the invention.

Referring to FIG. 2, a range finder 30 in accordance with a first embodiment of the invention includes a laser transmitter 31, a laser receiver 32, an objective lens unit, an image sensing device 35, a display device 36, an eyepiece 37, a collimating lens 38, a collective lens 39 and a microphone 40, wherein the objective lens unit includes an objective lens 33 and a focusing lens 34.

The laser transmitter 31, the collimating lens 38, the laser receiver 32 and the conservation lens 39 constitute a laser transmitting and receiving system of the range finder 30. The objective lens 33, the focusing lens 34 and the image sensing device 35 constitute an image capturing system of the range finder 30. The display device 36 and the eyepiece 37 constitute a distance measuring system of the range finder 30.

When the range finder 30 is disposed toward a measured region (not shown), visible light V30 from the measured region enters the range finder 30 and is received by the image sensing device 35 to generate an image. The image is transmitted to and displayed by the display device 36 for observation by a user. The user is able to aim the range finder 30 at a measured object (not shown) in the measured region through observing the image. The laser transmitting and receiving system emits a laser beam 31T to the measured object and receives a reflected laser beam 31R reflected by the measured object, whereby a distance from the measured object to the range finder 30 is calculated and displayed by the display device 36. The microphone 40 is configured to record environmental sound. It is worth noting that the objective lens unit is with a large aperture for collecting and receiving a great amount of light so that the range finder 30 can be used by night (or in a low-light environment).

Referring to FIG. 2 again, when the range finder 30 is disposed toward the measured region (not shown), visible light V30 from the measured region is received by the range finder 30. The visible light V30 passes through the objective lens 33 and the focusing lens 34 and finally reaches the image sensing device 35. The image sensing device 35 converts the visible light V30 into an image signal. The image signal is transmitted to and displayed by the display device 36. The image displayed by the display device 36 is observed by a user through the eyepiece 37.

When the range finder 30 is aimed at the measured object in the measured region, the laser transmitter 31 emits a laser beam 31T. The laser beam 31T passes through the collimating lens 38 to become a collimated laser beam 31T, and the collimated laser beam 31T travels to reach the measured object and is reflected by the measured object to become a reflected laser beam 31R. The reflected laser beam 31R is received by the range finder 30. The received reflected laser beam 31R passes through the collective lens 39 and afterwards enters the laser receiver 32. The laser receiver 32 receives the reflected laser beam 31R to calculate a distance between the measured object and the range finder 30. The calculated distance value is displayed by the display device 36 and observed by a user through the eyepiece 37.

In the above embodiment, the reflected laser beam 31R directly enters the laser receiver 32. It is understood that a filter can be disposed between the collective lens 39 and the laser receiver 32 allowing only the reflected laser beam 31R to pass therethrough, which also belongs to the category of the invention.

In some embodiments, the laser transmitter 31 is a semiconductor laser. The laser receiver 32 is an avalanche photodiode or a photodiode. The image sensing device 35 is a charge coupled device or a complementary metal-oxide-semiconductor image sensing element. The display device 36 is a liquid crystal display, an organic liquid crystal display or an active-matrix organic light emitting diode display.

Figure 3A:
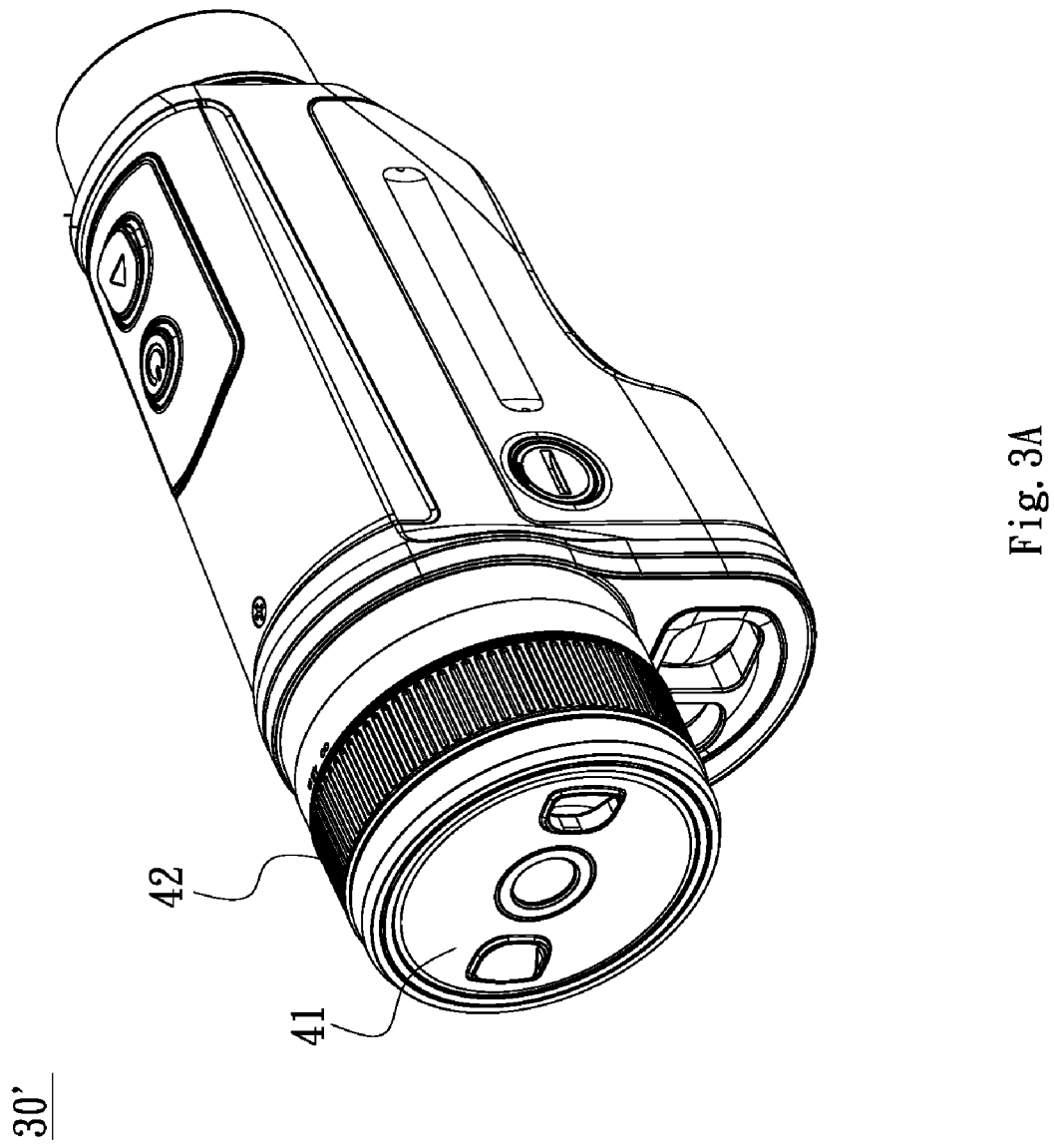
FIG. 3A is a perspective view of a range finder in accordance with a second embodiment of the invention.
Figure 3B:
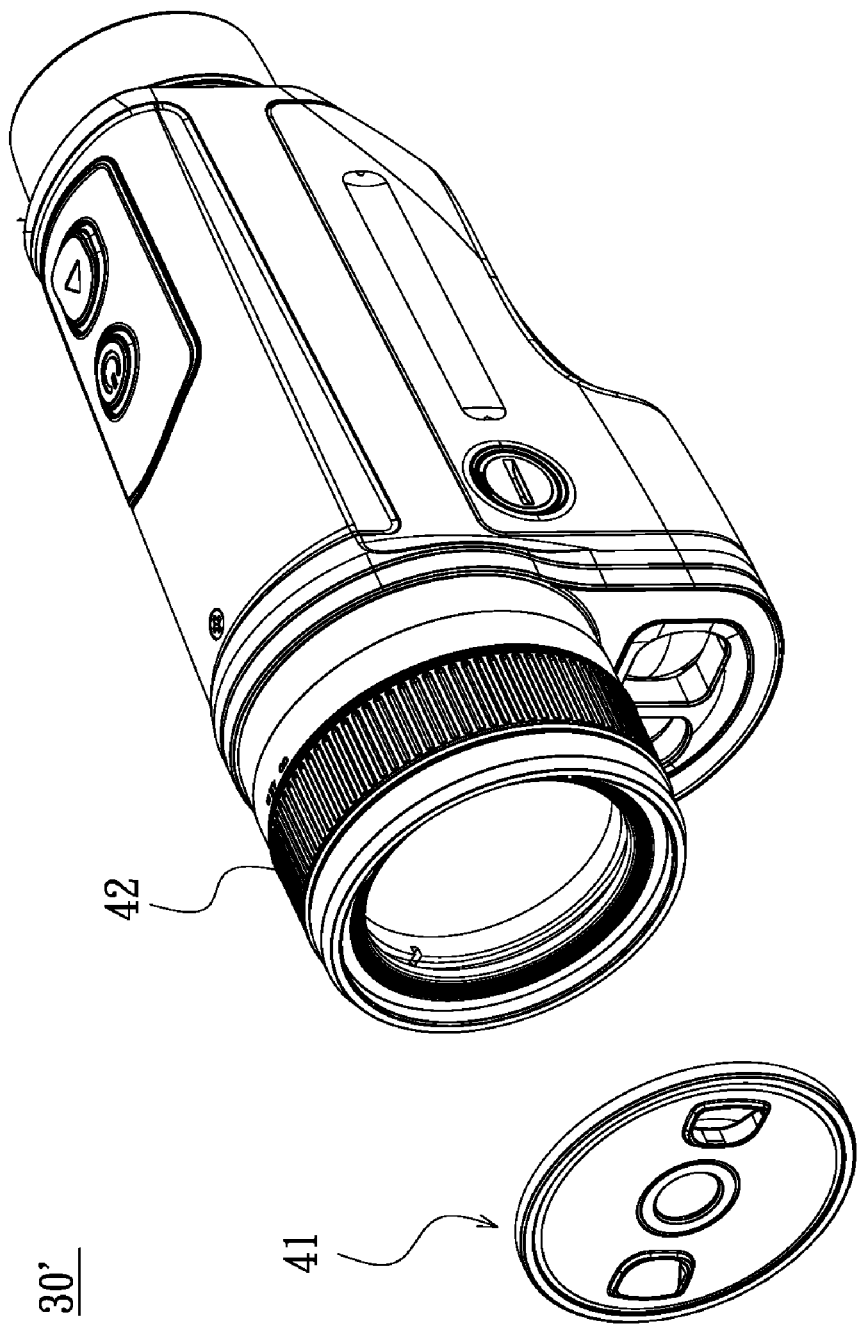
FIG. 3B depicts that a detachable frontal cover of the range finder of FIG. 3A is detached for operating at night.

A range finder 30' in accordance with a second embodiment of the invention, similar to that of the first embodiment, includes a laser transmitter, a laser receiver, an objective lens unit, an image sensing device, a display device, an eyepiece, a collimating lens, a collective lens, and a microphone. Referring to FIGS. 3A and 3B, the ranger finder 30' of the second embodiment further includes a detachable frontal cover 41 and an adjusting ring 42.

Figure 4:
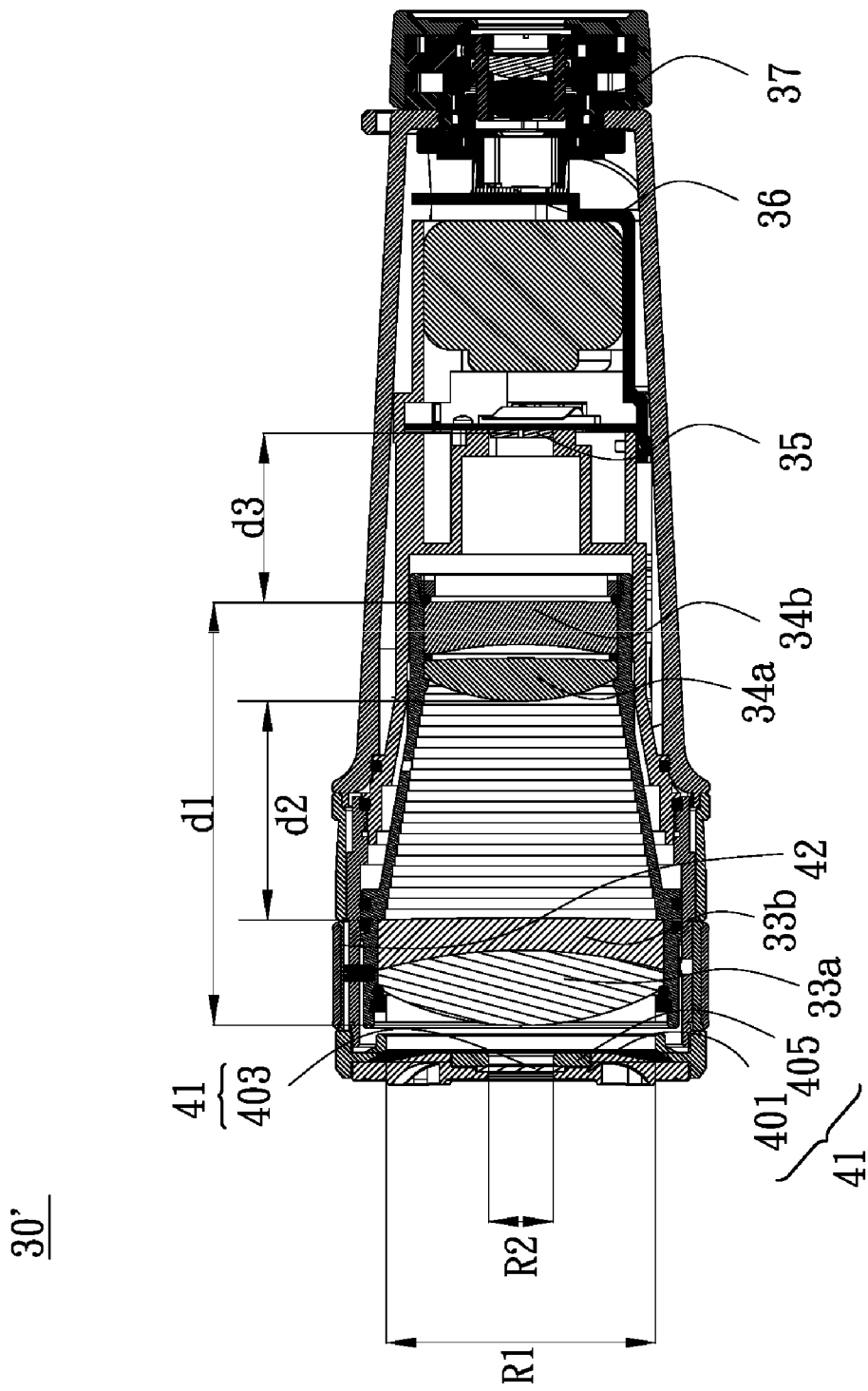
FIG. 4 is a sectional view of the range finder of FIG. 3A.

Referring to FIG. 4, in the second embodiment, the objective lens unit includes a first objective lens 33a, a second objective lens 33b, a first focusing lens 34a and a second focusing lens 34b, which are sequentially arranged from an object side to an image side. The first objective lens 33a has a first surface facing the object side. The second object lens 33b has a second surface facing the image side. The first focusing lens 34a has a third surface facing the object side. The second focusing lens 34b has a fourth surface facing the image side. The objective lens unit has a first length d1 of 78.865 mm, which is constant and defined as the distance between a center of the first surface of the first objective lens 33a and a center of the fourth surface of the second focusing lens 34b. The objective lens unit also has a second length d2 of 40.32 mm, which is constant and defined as the distance between a center of the second surface of the second objective lens 33b and a center of the third surface of the first focusing lens 34a. It is worth noting that a first ratio of the first length to the second length d1/d2 is 0.511±5%, in other words the first ratio ranges from 0.48545 (or 0.48 after rounded down to hundredths) to 0.53655 (or 0.54 after rounded up to hundredths). It is understood that the rounding method is made only for the purpose of expressing the approximate values of the invention and should not be taken in a limiting sense.

The adjusting ring 42 is configured to move the objective lens unit 33a, 33b, 34a and 34b with respect to the image sensing device 35 for focusing an image of a measured object (not shown) on the image sensing device 35 in focusing operation. During the focusing operation, the first objective lens 33a, the second objective lens 33b, the first focusing lens 34a and the second focusing lens 34b are moved together, with the distances between them kept unchanged. Further, if the image of the measured object is captured by the range finder 30' at an object distance, then a distance d3 between the objective lens unit and the image sensing device 35 ranges from 29.224 mm (when the object distance is ∞) to 30.463 mm (when the object distance is 4.5 m). That is, the objective lens unit has a moving distance of 1.239 mm, wherein a second ratio of the moving distance to the distance d3 is substantially 0.04. It is worth noting that the second ratio ranges from 0.038 to 0.045.

Referring to FIG. 5, the detachable frontal cover 41 includes a main body 401, an optical filter 403 and a retaining ring 405, wherein the optical filter 403 is disposed on the main body 401 by means of the retaining ring 405. The detachable frontal cover 41 is configured to constrain the light from entering the range finder 30' for decreasing the amount of light passing through the objective lens unit. However, it is understood that the detachable frontal cover 41 of the range finder 30' can be substituted with an iris aperture, an electrochromic sheet or a photochromic sheet.

It is worth noting that the objective lens unit has an f-number of 1.55±5%, in other words the f-number ranges from 1.4725 (or 1.47 after rounded down to hundredths) to 1.6275 (or 1.63 after rounded up to hundredths). In other words, the objective lens unit is with a large aperture for collecting and receiving a great amount of light. As shown in FIG. 4, the aperture of the objective lens unit has a first diameter R1 of 50 mm. An aperture of the detachable frontal cover 41 has a second diameter R2 of 12 mm. It is worth noting that a third ratio of the second diameter to the first diameter R2/R1 is 0.24±5%, in other words the third ratio ranges from 0.228 (or 0.22 after rounded down to hundredths) to 0.252 (or 0.26 after rounded up to hundredths), and a fourth ratio of the aperture of the detachable frontal cover 41 to the aperture of the objective lens unit is 0.0576±5%, in other words the fourth ratio ranges from 0.05472 (or 0.05 after rounded down to hundredths) to 0.06048 (or 0.06 after rounded up to hundredths). It is understood that the rounding method is made only for the purpose of expressing the approximate values of the invention and should not be taken in a limiting sense.

During operation, when the range finder 30' is directed toward the measured region (not shown), visible light (not shown) from the measured region is received by the range finder 30'. As shown in FIGS. 3A and 4, the detachable frontal cover 41 is attached for decreasing the amount of the visible light if the range finder 30' is used by day. The visible light passes through the detachable frontal cover 41, the first objective lens 33a, the second objective lens 33b, the first focusing lens 34a and the second focusing lens 34b and finally reaches the image sensing device 35. The image sensing device 35 converts the visible light into an image signal. The image signal is transmitted to and displayed by the display device 36. The image displayed by the display device 36 is observed by a user through the eyepiece 37.

Further, as shown in FIG. 3B, the detachable frontal cover 41 is detached for collecting and receiving a great amount of the visible light if the range finder 30' is used by night (or in a low-light environment). Therefore, the visible light directly passes through first objective lens 33a, the second objective lens 33b, the first focusing lens 34a and the second focusing lens 34b and reaches the image sensing device 35. The arrangement of other elements and operation are similar to those of the first embodiment, and therefore the descriptions thereof are omitted.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A range finder, comprising:
   a laser transmitter configured to emit a laser beam to a measured object;
   a laser receiver configured to receive a reflected laser beam reflected by the measured object;
   a objective lens unit configured to allow visible light reflected by the measured object to pass therethrough, comprising a first objective lens having a first surface facing an object side and a first focusing lens having a second surface facing an image side;
   an image sensing device configured to receive the visible light passing through the first objective lens and generate an image signal;

a display device configured to receive the image signal and display an image of the measured object; and wherein the objective lens unit has a first length, the first length is constant and defined as a distance between a center of the first surface and a center of the second surface;

wherein the objective lens unit is configured to move with respect to the image sensing device for focusing operation;

wherein the reflected laser beam does not pass through the objective lens unit;

wherein the objective lens unit has an f-number ranging from 1.47 to 1.63.

2. The range finder as claimed in claim 1, further comprising a collimating lens disposed between the laser transmitter and the measured object.

3. The range finder as claimed in claim 1, further comprising a collective lens disposed between the laser receiver and the measured object.

4. The range finder as claimed in claim 1, wherein the first focusing lens is disposed between the first objective lens and the image sensing device.

5. The range finder as claimed in claim 1, further comprising an eyepiece disposed near the display device for observing the display device.

6. The range finder as claimed in claim 1, wherein the display device comprises a liquid crystal display, an organic liquid crystal display or an active-matrix organic light emitting diode display.

7. The range finder as claimed in claim 1, further comprising an iris aperture, an electrochromic sheet or a photochromic sheet configured to constrain the visible light from entering the range finder.

8. The range finder as claimed in claim 1, further comprising a filter disposed between the collective lens and the laser receiver to allow only the reflected laser beam to pass.

9. The range finder as claimed in claim 1, wherein the objective lens unit has a moving distance, a second ratio of the moving distance to a distance between the objective lens unit and the image sensing device is about 0.04.

10. The range finder as claimed in claim 9, wherein the second ratio of the moving distance to the distance between the objective lens unit and the image sensing device ranges from 0.038 to 0.045.

11. The range finder as claimed in claim 9, further comprising an adjusting ring configured to move the objective lens unit with respect to the image sensing device for adjusting the distance.

12. The range finder as claimed in claim 9, wherein the image of the measured object is captured by the range finder at an object distance, and the object distance ranges from 4.5 m to ∞ when the distance between the objective lens unit and the image sensing device is adjusted.

13. The range finder as claimed in claim 1, further comprising a detachable frontal cover configured to constrain the visible light from entering the range finder for decreasing the amount of the visible light passing through the objective lens unit.

14. The range finder as claimed in claim 13, wherein the detachable frontal cover comprises a main cover, an optical filter and a retaining ring, and the optical filter is disposed on the main cover by means of the retaining ring.

15. The range finder as claimed in claim 13, wherein an aperture of the objective lens unit has a first diameter, an aperture of the detachable frontal cover has a second diameter and a ratio of the second diameter to the first diameter ranges from 0.22 to 0.26.

16. The range finder as claimed in claim 13, wherein a ratio of an aperture of the detachable frontal cover to an aperture of the objective lens unit ranges from 0.05 to 0.06.

17. The range finder as claimed in claim 1, wherein the objective lens unit further comprises a second objective lens having a third surface facing the image side and a second focusing lens having a fourth surface facing the object side and has a second length, the first objective lens, the second objective lens, the second focusing lens and the first focusing lens are sequentially arranged from the object side to the image side and the second length is constant and defined as a distance between a center of the third surface and a center of the fourth surface.

18. The range finder as claimed in claim 17, wherein a ratio of the second length to the first length ranges from 0.48 to 0.54.

* * * * *